Sept. 14, 1926. 1,600,166
F. P. DUNN
PENDULUM SCALE
Original Filed Jan. 12, 1918   2 Sheets-Sheet 1
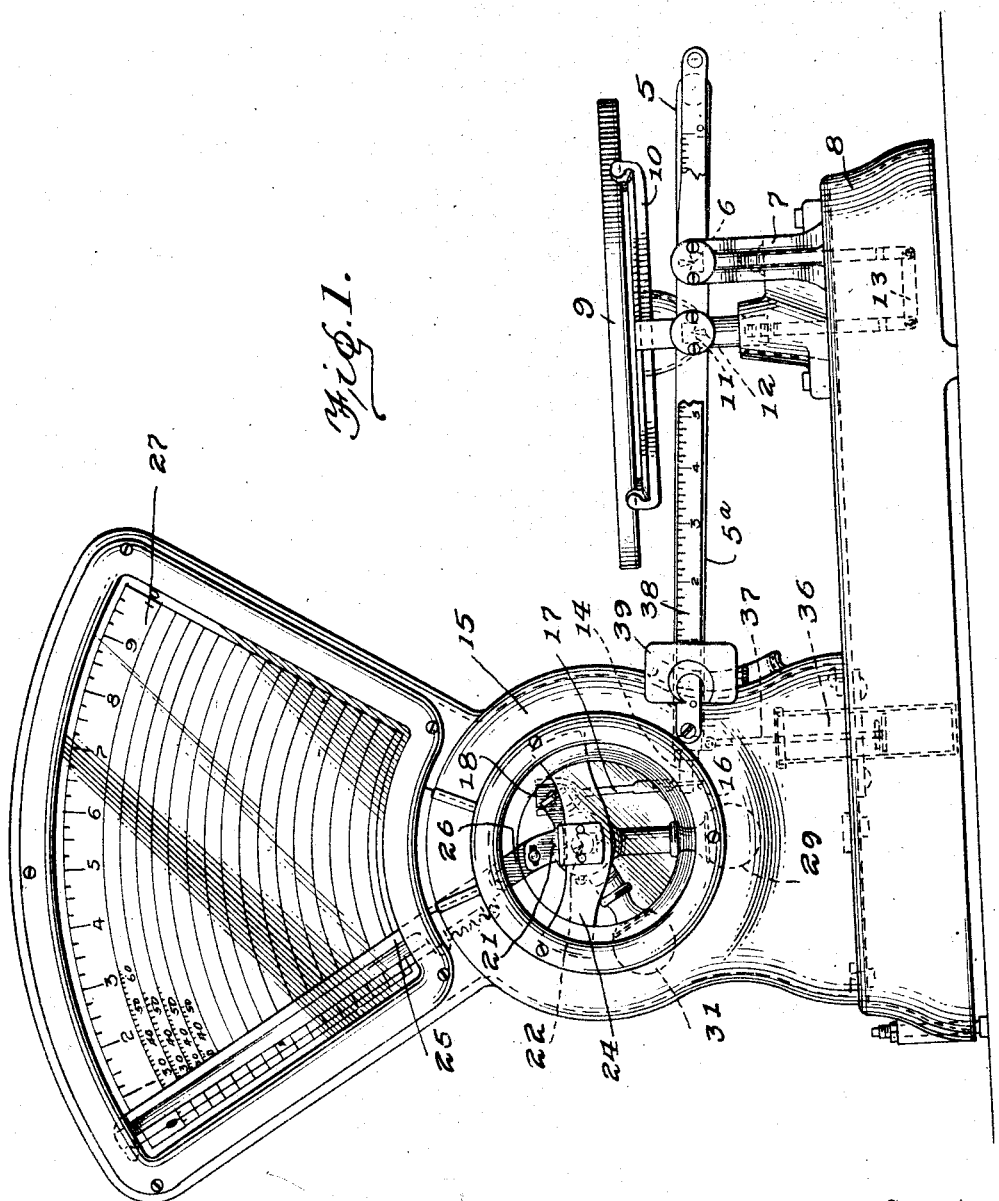
Inventor
Frank P. Dunn
By George R. Frye.
Attorney
Witnesses
H. H. Lybrand Sept. 14, 1926.    F. P. DUNN    1,600,166
PENDULUM SCALE
Original Filed Jan. 12, 1918    2 Sheets-Sheet 2
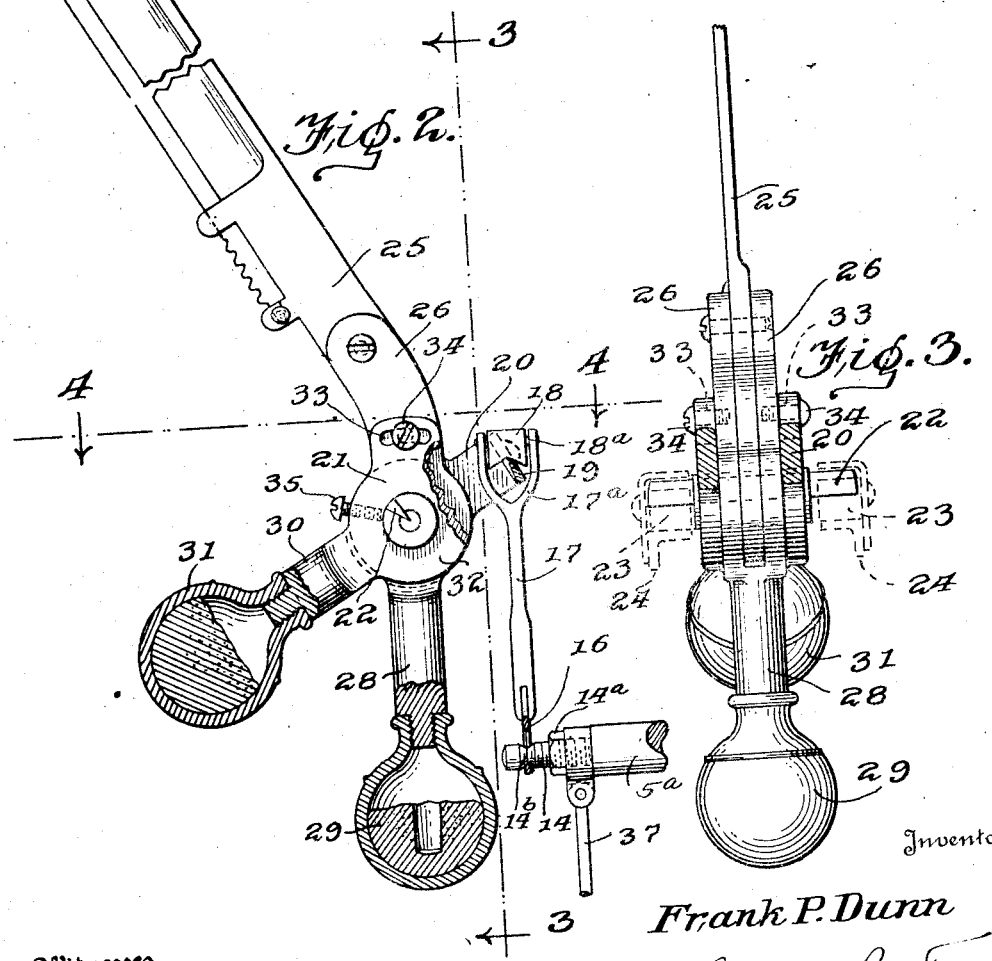
Inventor
Frank P. Dunn
By George R. Frye.
Attorney Patented Sept. 14, 1926.

1,600,166

UNITED STATES PATENT OFFICE.

FRANK P. DUNN, OF ANDERSON, INDIANA, ASSIGNOR TO TOLEDO SCALE COMPANY, OF TOLEDO, OHIO, A CORPORATION OF NEW JERSEY.

PENDULUM SCALE.

Application filed January 12, 1918, Serial No. 211,487. Renewed March 8, 1926.

This invention relates to pendulum scales and may be utilized in either computing scales or non-computing scales of this well-known type.

It has heretofore been the custom in manufacturing pendulum scales to provide a counterweight on the arm of the main lever opposite that which supports the scale platform for the purpose of counterbalancing the weight of the platform and its connected parts, including the lever itself, so that the pull exerted upon the pendulum mechanism when there is no commodity upon the platform will be substantially nil. Scales of this type are illustrated for example in the re-issue patent to De Vilbiss No. 12,138, re-issued July 28, 1903. This counter-weight has the advantage of maintaining practically the entire weight of the pendulum for offsetting the weight of commodities, but also has the disadvantage of increasing both the weight and length of the main lever, thereby increasing the manufacturing cost.

The primary object of my invention is to simplify the construction of scales of this type, doing away with the counterbalance weight on the lever and rendering the scale lighter and more compact. In accomplishing this I provide an arm on the pendulum which is arranged to support an adjustable weight of sufficient mass to counterbalance the weight of the main lever, platform and connected parts. This pendulum weight is quite distinct from and in no way hampers the pendulum weight utilized to counterbalance the weight of commodities placed upon the platform.

A further object of my invention is to provide a novel form of link between the pendulum and main lever whereby it is possible to utilize an easily constructed nose iron member on the main lever having a circular groove therein for the reception of the lower knife edge of the link, this nose iron being readily adjustable longitudinally of the lever, as required.

Other objects and advantages of the invention will appear from the following description wherein reference is had to the accompanying drawings illustrating a preferred embodiment of my invention and wherein similar reference numerals designate similar parts throughout the several views.

In the drawings:—

Fig. 1 is a side elevation of a scale embodying my invention;

Fig. 2 is a detail front elevation of the pendulum mechanism and connection with the lever, parts being broken away;

Fig. 3 is a side elevation thereof taken substantially on the line 3—3 of Fig. 2 looking in the direction of the arrows; and Fig. 4 is a plan view taken on the line 4—4 of Fig. 3.

In the drawings, the main scale beam 5 is fulcrumed as at 6 upon standards 7 rising from the scale base 8 and has mounted upon it the platform 9, which preferably rests upon a spider support 10 having downwardly extending bearings 11 resting upon the upwardly turned pivots 12 on the scale beam. A suitable check link mechanism 13 is arranged between posts extending downwardly in vertical alignment with the fulcrum and platform-supporting pivots of the beam. Thus the main lever is a lever of the second order and the entire weight of the platform and supporting members tends to force downwardly the extremity $5^a$ of the lever which carries the nose iron 14 (see Fig. 2). This end of the lever, which will hereinafter be called the inner end, extends within the housing 15 through an opening in the side thereof, and the nose iron 14 rests within the knife edge stirrup 16 at the lower extremity of the link 17, the upper end of which is formed with a rockable bearing 18 engaging the upwardly-extending knife-edge pivot 19 on the arm 20 extending radially from the hub of the pendulum 21. The nose iron 14 is preferably threaded into the end of the lever 5, being locked in any adjusted position by means of the lock nut $14^a$, and is provided with the circular groove $14^b$ of substantially the shape shown in Fig. 2. The pivot 18 at the upper extremity of the link 17 is preferably formed of agate, hardened metal or the like and is provided with trunnions $18^a$ entering apertures in the yoke $17^a$ of the link, whereby the bearing 18 is free to pivot freely to always maintain its engagement with the pivot 19 throughout its range of movement.

The pendulum 21 is provided with knife-edge pivots 22 extending laterally on each side thereof and resting in the fixed bearings 23 mounted upon the cross-arms 24 of the scale housing. An index hand 25 is rigidly secured to the upwardly-extending arm 26 of the pendulum and swings across the dial 27 in an arcuate movement of which the center is, of course, the fixed pendulum pivot 21. This dial 27 may be suitably inscribed with weight and value graduations as desired. Depending from the hub of the pendulum 21 is an arm 28 adapted to receive an adjustable weight 29, which weight is effective to counterbalance the weights of commodities as will be hereinafter explained. This weight normally falls into a substantially vertical position when no commodity is upon the platform 9, thus serving to hold the indicator hand 25 at zero position while giving the fullest possible scope to the counterbalancing properties of the pendulum. Extending radially from the hub of the pendulum is a second arm 30 provided with an adjustable weight 31 which is so arranged and adjusted as to counterbalance the weight of the lever, platform and connected parts. This weighted arm is normally raised out of a vertical position so that the effective weight thereof will be exerted in counterbalancing the afore-mentioned parts, and the center of mass thereof is arranged diametrically opposite the pivot point of the radial arm 20 through which connection is made to the lever 5. With such an arrangement the swinging movement of the arm 20 as the pendulum swings to offset the weight of commodities will not affect the effective weight of the weighted arm 30, which will remain constant at all positions of the arm 20 and the connected parts.

To provide means for readily sealing the scale I preferably mount the weighted arm 30 in a casting having side members 32 fitting around the hub of the pendulum outside of the member supporting the weighted arm 28 (see Fig. 3) and provided with curved slots 33 co-operating with set screws 34 secured in the central member. Thus, the weighted arm 30 and the radial arm 20 can be revolved about the axis of the pendulum until they are in the desired position offsetting the weight of the platform, lever and connected parts, and are then secured in such position by tightening the set screws 34. If necessary, the weighted arm 28 may also be revolved about the pivots 22 of the pendulum to effect a desired adjustment, and may then be locked in such position by the set screws 35 (see Fig. 2).

Suitable damping means may be provided for checking the oscillations of the movable parts of the scale. As herein shown, a dash pot 36 is secured in the base of the scale and extends upwardly within the housing 15, the plunger 37 thereof being secured to the lever 5 adjacent the nose iron 14 (see Fig. 1).

The operation of the scale is believed to be apparent from the foregoing description. The platform lever mechanism and connected parts being normally offset by the weighted arm 30, the pendulum mechanism with its weighted arm 28 is effective to counterbalance the weights of any commodities placed upon the platform. The load counterbalancing action is as follows: When a commodity is placed upon the platform the lever 5 swings on its fulcrum, depressing its inner end to lower the link 17 connecting the lever with the pendulum mechanism. The pull of this link exerted on the radial arm 20 swings the entire pendulum mechanism on its fulcrum pivot 22, raising the weighted arm 29 to a position offsetting the weight of the commodity and simultaneously swinging the index hand across the dial 27 to a position indicating such weight. When the commodity is removed the weighted arm 29 falls to its normal substantially vertical position, and returns the movable parts of the scale to their original positions. Should it be desired to increase the capacity of the pendulum mechanism or to provide means to tare out the weight of containers, etc., a graduated beam 38 may be provided on the main lever, a poise 39 being slidable thereover in the usual manner.

While it will be apparent that the illustrated embodiment of my invention herein disclosed is well calculated to adequately fulfill the objects primarily stated, it is to be understood that the invention is susceptible to variation, modification and change without departing from the spirit and scope of the invention as set forth in the subjoined claims.

Having described my invention, I claim:

1. In a scale of the character described, a lever, a platform mounted thereon, a weighted pendulum having a radial arm carrying a pivot, and a link connecting the lever with the pendulum arm and having a bearing pivotally secured therein and engaging the pivot in said arm.

2. In a scale of the character described, a lever, a platform mounted thereon, a weighted pendulum having a radial arm carrying a pivot, and a link connecting the lever with the pendulum arm, said link carrying a bearing pivotally mounted by trunnions thereon and engaging the pivot in said arm.

3. In a scale of the character described, a lever, a platform mounted thereon, a weighted pendulum having a radial arm carrying a pivot, and a link connecting the lever with the pendulum arm, the lever carrying an adjustable nose iron member having a bearing surface and the link carrying a pivot engaging such bearing surface.

4. In a scale of the character described, a lever, a platform mounted thereon, a weighted pendulum having a radial arm carrying a pivot, and a link connecting the lever with the pendulum arm, the lever carrying an adjustable nose iron member having a channeled groove therein and the link having a pivot engaging in said groove.

5. In a scale of the character described, a lever, a platform mounted thereon, a weighted pendulum having a radial arm carrying a pivot, and a link connecting the lever with the pendulum arm, the lever carrying an adjustable nose iron member having a circular channeled groove therein and the link having a pivot engaging in said groove.

FRANK P. DUNN.